United States Patent
Sakai et al.

(10) Patent No.: US 6,780,801 B1
(45) Date of Patent: Aug. 24, 2004

(54) RAW MATERIAL COMPOSITION FOR SODA-LIME GLASS

(75) Inventors: Chihiro Sakai, Osaka (JP); Yoshikazu Toshikiyo, Osaka (JP)

(73) Assignee: Nippon Sheet Glass Co., Ltd., Osaka (JP)

( * ) Notice: Subject to any disclaimer, the term of this patent is extended or adjusted under 35 U.S.C. 154(b) by 0 days.

(21) Appl. No.: 09/486,973

(22) PCT Filed: Jul. 6, 1999

(86) PCT No.: PCT/JP99/03630

§ 371 (c)(1),
(2), (4) Date: Mar. 6, 2000

(87) PCT Pub. No.: WO00/01631

PCT Pub. Date: Jan. 13, 2000

(30) Foreign Application Priority Data

Jul. 7, 1998 (JP) .......................................... 10-191221

(51) Int. Cl.⁷ .............................. C03C 6/00; C03C 3/87
(52) U.S. Cl. .............................. 501/27; 501/64; 501/70; 501/71
(58) Field of Search .............................. 501/27, 64, 70, 501/71, 904, 905

(56) References Cited

U.S. PATENT DOCUMENTS

| | | | | |
|---|---|---|---|---|
| 3,296,004 A | * | 1/1967 | Duncan ...................... | 359/885 |
| 3,375,095 A | * | 3/1968 | Poole ......................... | 65/134.5 |
| 3,589,885 A | * | 6/1971 | Monks ........................ | 65/134.3 |
| 3,753,743 A | * | 8/1973 | Kakuda et al. ................ | 501/31 |
| 3,779,733 A | * | 12/1973 | Janakirama-Rao ........... | 501/70 |
| 4,062,689 A | * | 12/1977 | Suzuki et al. ................. | 501/38 |
| 4,270,945 A | * | 6/1981 | Amrhein et al. .............. | 501/70 |
| 5,112,778 A | * | 5/1992 | Cheng et al. ................. | 501/70 |
| 5,436,206 A | * | 7/1995 | Amundson, Jr. .............. | 501/71 |
| 5,523,263 A | * | 6/1996 | Penrod ........................ | 501/70 |
| 5,641,716 A | * | 6/1997 | Higby et al. .................. | 501/71 |
| 5,725,628 A | * | 3/1998 | Boulos et al. ................ | 501/71 |
| 6,046,122 A | * | 4/2000 | Nagashima et al. .......... | 501/64 |
| RE37,328 E | * | 8/2001 | Pecoraro et al. .............. | 501/70 |
| 6,306,786 B1 | * | 10/2001 | Koyama et al. .............. | 501/69 |

FOREIGN PATENT DOCUMENTS

| | | |
|---|---|---|
| EP | 0 823 404 | 2/1998 |
| JP | 51-007006 | 1/1976 |
| JP | 07-144922 | 6/1995 |
| JP | 09-169537 | 6/1997 |

OTHER PUBLICATIONS

Heiji Tabuchi et al., "Raw Composition for Flat Glass", Chemical Abstracts, May 19, 1975, vol. 82, No. 20, Columbus, Ohio, US.
European Search Report, May 8, 2003.
PCT International Search Report, Sep. 24, 1999.

* cited by examiner

*Primary Examiner*—Karl Group
(74) *Attorney, Agent, or Firm*—RatnerPrestia

(57) ABSTRACT

The present invention provides a raw material composition for soda-lime glass capable of effectively suppressing formation of nickel sulfide (NiS) in the course of melting of the glass raw material. A nickel sulfide (NiS) impurity present in soda-lime glass is formed in a high-temperature vitrification step in which metal particles containing Ni and an Ni component of stainless steel used for the interior of a melting furnace, which are mixed into glass raw material, react at high temperature with a sulfur (S) component in $Na_2SO_4$ serving as a glass raw material. However, when an additive containing an oxide, a chloride, a sulfate, or a nitrate of a metal is added in a very small amount and in advance to glass raw material, formation of NiS by the reaction between Ni and S in the course of melting can be suppressed or completely eliminated.

8 Claims, No Drawings

RAW MATERIAL COMPOSITION FOR SODA-LIME GLASS

FIELD OF THE INVENTION

The present invention relates to a raw material composition for soda-lime glass, and more particularly to a raw material composition for soda-lime glass capable of effectively suppressing formation of nickel sulfide (NiS) in a glass base in the course of melting of the glass raw material, to thereby produce a glass product of high quality.

BACKGROUND OF THE INVENTION

In a conventional method for producing soda-lime glass, in a step for melting glass raw material at a temperature as high as near 1,500° C. in a melting furnace, a nickel (Ni) component contained in stainless steel used for the interior of the melting furnace and Ni-containing metal particles (e.g., stainless steel particles) present in glass raw material as an impurity may be mixed into molten glass, and the Ni component may react with a sulfur (S) component in mirabilite ($Na_2SO_4$) serving as a glass raw material. As a result, nickel sulfide (NiS) may be present as a fine impurity in a melt-molded glass substrate. The incidence of an NiS impurity in a defective glass product is very low; i.e., the number of impurities is about one in some 10 tons (t) of glass products. In addition, the impurity has a spherical particle and the particle size is as small as 0.3 mm or less, and thus detection of the impurity in a production line is very difficult.

In order to process a substrate formed of such soda-lime glass into glass for a building or a toughened glass plate for an automobile, the substrate is heated to the softening point (near 600° C.) and quenched, to thereby produce compressive stress in the surface layers of the glass plate.

When nickel sulfide (NiS) is contained as an impurity in toughened glass which is heated and cooled to ambient temperature in a toughening step, α-phase NiS, which is stable at about 350° C. or higher, is present in an unstable state. Since α-Phase NiS is unstable at ambient temperature, with passage of time it is transformed into β-phase NiS, which is stable at ambient temperature. The volume of NiS increases concomitant with phase transformation. A toughened glass plate contains a tensile stress layer having a thickness which is about ⅔ the overall thickness of the plate, and thus cracks grow rapidly due to an increase in NiS volume in the tensile stress layer, to thereby cause spontaneous breakage of the glass plate.

In order to prevent such spontaneous breakage of toughened glass, a method for removing a defective product containing an NiS impurity is known (which method is called soaking treatment). In the method, toughened glass which is heated and cooled to ambient temperature in a toughening step is placed in a firing furnace (a soaking furnace) and re-heated and maintained therein for a predetermined period of time, and any unstable α-phase NiS contained in the toughened glass is transformed into β-phase NiS, which is stable at about 300° C. or less, to thereby increase the volume of NiS and compulsorily break the defective glass.

However, in such steps mainly comprising thermal treatment, a long period time and a great amount of thermal energy are used in order to raise temperature, and thus production cost may increase. In addition, such steps raise a serious problem against reduction in production time and enhancement of productivity.

SUMMARY OF THE INVENTION

In order to solve the aforementioned problems involved in conventional techniques, an object of the present invention is to provide a raw material composition for soda-lime glass capable of effectively suppressing formation of nickel sulfide (NiS) in the course of melting of the glass raw material.

Another object of the present invention is to provide a raw material composition of soda-lime glass capable of effectively suppressing formation of NiS in the course of melting of the glass raw material when the material contains, as a coloring component, ferric oxide ($Fe_2O_3$), selenium (Se), cerium (Ce), or other metallic materials in a very small amount.

DETAILED DESCRIPTION OF THE INVENTION

A nickel sulfide (NiS) impurity in soda-lime glass is formed in a high-temperature vitrification step in which metallic particles containing Ni and an Ni component contained in stainless steel used for a melting furnace, which are mixed into glass raw material, react with a sulfur (S) component in $Na_2SO_4$ serving as a glass raw material. When an additive including an oxide, chloride, sulfate, or a nitrate of a metal is added in a very small amount and in advance to glass raw material, formation of NiS by reaction between Ni and S in the course of melting may be suppressed or completely eliminated, for the reasons described below. When a metal oxide is added in a very small amount to glass raw material, NiS reacts with other metals to form a eutectic compound, and the decomposition temperature decreases. When a chloride, sulfate, or a nitrate of a metal is added in a very small amount to glass raw material, oxidation is promoted, and thus formation of sulfides of Ni becomes difficult. As a result, formation of NiS may be suppressed.

In one embodiment of the present invention, the raw material composition is characterized by comprising a mirabilite($Na_2SO_4$)-containing glass raw material to which an additive containing an oxide, a chloride, a sulfate, or a nitrate of a metal is incorporated.

In another embodiment of the present invention, the raw material composition is characterized by comprising a glass raw material including mirabilite ($Na_2SO_4$) and, as a coloring component, at least one species selected from the group consisting of ferric oxide ($Fe_2O_3$), selenium (Se), cerium (Ce), and other metallic materials, wherein the glass raw material further include an additive containing an oxide, a chloride, a sulfate, or a nitrate of a metal.

The aforementioned metal is at least one species selected from the group consisting of tin (Sn), iron (Fe), cobalt (Co), manganese (Mn), lead (Pb), lithium (Li), potassium (K), and sodium (Na). The percentage by weight of the aforementioned additives may be 0.15% or less on the basis of the total weight of the aforementioned glass raw material.

The incidence of an NiS impurity in a defective glass product is about one in some 10 tons (t) of glass products in a float-type melting furnace in practice, and the amount of Ni component contained in glass products is very low; i.e., 10 ppm (0.001 wt. %) or less. Therefore, only a ultra-very small amount of a metal oxide or the like is required to be added to glass raw material for the present invention to exhibit sufficient effects on reduction or complete elimination of formation of nickel sulfide (NiS).

EXAMPLES

Example 1

There was performed a test simulating the case in which nickel (Ni) metal reacts with a sulfur (S) component to thereby form nickel sulfide (NiS) in the course of melting of glass raw material in a float-type melting furnace in practice.

The respective raw materials shown in Table 1 were mixed, to thereby prepare a glass raw material (200 g). Subsequently, powder of metallic Ni (particle size: 149 μm) was added to the glass raw material in an amount by weight of 0.07% on the basis of the total weight of the material, to thereby prepare Ni-powder-containing glass raw material 1.

TABLE 1

| Raw material | Amount used (g) |
| --- | --- |
| Silica sand | 92.0 |
| Soda ash | 26.5 |
| Dolomite | 23.6 |
| Limestone | 5.8 |
| Mirabilite | 2.0 |
| Carbon | 0.1 |
| Cullet | 50.0 |
| Total | 200.0 |

Ni-powder-containing glass raw material 1 was placed in an alumina crucible (volume: 250 cc), and the crucible was pre-heated at 600° C. for 30 minutes and placed in an electric furnace maintained at 1,370° C. The temperature was raised to 1,400° C. over 10 minutes. The crucible was maintained in the furnace at the temperature for 2.2 hours and removed from the furnace. The thus-heated glass material was cast, to thereby prepare sample glass 1.

Table 2 shows the amount of added Ni powder (wt. %), the maximum particle size of NiS particles (μm), and the number of NiS particles per glass weight (number/g) in sample glass 1. The number of NiS particles was determined by observation under a stereoscopic microscope.

TABLE 2

| | Amount of addition (wt. %) | Maximum particle size (μm) | Number (number/g) |
| --- | --- | --- | --- |
| Sample 1 | 0.0700 | 120 | 1.13 |

There were prepared five sets of glass raw material having the same composition as glass raw material 1 used for preparing sample glass 1 in which NiS was formed.

Tin oxide ($SnO_2$), an oxide of tin (Sn), was added to one of the above five sets of glass raw material, to thereby prepare glass raw material containing Ni metal powder and $SnO_2$; i.e., glass raw material 2.

In the same manner, iron oxide ($Fe_2O_3$), an oxide of iron (Fe), was added to one of the above five sets of glass raw material, to thereby prepare glass raw material containing Ni metal powder and $Fe_2O_3$; i.e., glass raw material 3.

In the same manner, cobalt oxide (CoO), an oxide of cobalt (Co), was added to one of the above five sets of glass raw material, to thereby prepare glass raw material containing Ni metal powder and CoO; i.e., glass raw material 4.

In the same manner, manganese oxide (MnO), an oxide of manganese (Mn), was added to one of the above five sets of glass raw material, to thereby prepare glass raw material containing Ni metal powder and MnO; i.e., glass raw material 5.

In the same manner, lead oxide (PbO), an oxide of lead (Pb), was added to one of the above five sets of glass raw material, to thereby prepare glass raw material containing Ni metal powder and PbO; i.e., glass raw material 6.

Each of these glass raw materials 2 to 6 was placed in an alumina crucible, and the crucible was placed in an electric furnace, heated, and maintained in the furnace. Thereafter, the crucible was removed from the furnace. The thus-heated glass materials were cast, to thereby obtain sample glasses 2 to 6. Table 3 shows the amount of added additives (wt. %), the maximum particle size of NiS particles (μm), and the number of NiS particles per glass weight (number/g) in the respective sample glasses.

TABLE 3

| | Additive | Amount of addition (wt. %) | Maximum particle size (μm) | Number (number/g) |
| --- | --- | --- | --- | --- |
| Sample 2 | $SnO_2$ | 0.1500 | 200 | 0.52 |
| Sample 3 | $Fe_2O_3$ | 0.1500 | 120 | 0.50 |
| Sample 4 | CoO | 0.1500 | — | 0.00 |
| Sample 5 | MnO | 0.1500 | 200 | 0.47 |
| Sample 6 | PbO | 0.1500 | 200 | 0.67 |

As is apparent from Table 3, when a metal oxide is added in a very small amount to the glass raw material, formation of NiS in a glass product is effectively suppressed.

Example 2

There were prepared three sets of glass raw material having the same composition as glass raw material 1 used for preparing sample glass 1 in which NiS was formed.

Subsequently, sodium nitrate ($NaNO_3$), a nitrate of sodium (Na), was added to one of the above three sets of glass raw material, in an amount of 50% on the basis of the total amount of $NaNO_3$ and mirabilite ($Na_2SO_4$) in the glass raw material, to thereby prepare glass raw material containing Ni metal powder and $NaNO_3$; i.e., glass raw material 7.

In the same manner, potassium nitrate ($KNO_3$), a nitrate of potassium (K), was added to one of the above three sets of glass raw material, in an amount of 50% on the basis of the total amount of $KNO_3$ and mirabilite ($Na_2SO_4$) in the glass raw material, to thereby prepare glass raw material containing Ni metal powder and $KNO_3$; i.e., glass raw material 8.

In the same manner, lithium nitrate ($LiNO_3$), a nitrate of lithium (Li), was added to one of the above three sets of glass raw material, in an amount of 50% on the basis of the total amount of $LiNO_3$ and mirabilite ($Na_2SO_4$) in the glass raw material, to thereby prepare glass raw material containing Ni metal powder and $LiNO_3$; i.e., glass raw material 9.

Each of these glass raw materials 7 to 9 was placed in an alumina crucible, and the crucible was placed in an electric furnace, heated, and maintained in the furnace. Thereafter, the crucible was removed from the furnace. The thus-heated glass materials were cast, to thereby obtain sample glasses 7 to 9. Table 4 shows the addition condition of metal nitrates, the maximum particle size of NiS particles (μm), and the number of NiS particles per glass weight (number/g) in the respective sample glasses.

TABLE 4

| | Addition condition | Maximum particle size (μm) | Number (number/g) |
| --- | --- | --- | --- |
| Sample 7 | $NaNO_3$:$Na_2SO_4$ = 1:1 | 300 | 0.25 |
| Sample 8 | $KNO_3$:$Na_2SO_4$ = 1:1 | 400 | 0.39 |
| Sample 9 | $LiNO_3$:$Na_2SO_4$ = 1:1 | 300 | 0.20 |

As is apparent from Table 4, when a metal nitrate is added in a very small amount to the glass raw material, formation of NiS in a glass product is effectively suppressed.

Example 3

There were prepared seven sets of glass raw material having the same composition as glass raw material 1 used for producing sample glass 1 in which NiS was formed.

Iron (Fe) powder was added to one of the above seven sets of glass raw material, to thereby prepare glass raw material containing Ni metal powder and Fe; i.e., glass raw material 10.

In the same manner, iron oxide ($Fe_2O_3$), an oxide of Fe, was added to one of the above seven sets of glass raw material, to thereby prepare glass raw material containing Ni metal powder and $Fe_2O_3$; i.e., glass raw material 11.

In the same manner, iron chloride hydrate ($FeCl_3 \cdot 6H_2O$), a chloride of Fe, was added to one of the above seven sets of glass raw material, to thereby prepare glass raw material containing Ni metal powder and $FeCl_3 \cdot 6H_2O$; i.e., glass raw material 12.

In the same manner, iron sulfate hydrate ($FeSO_4 \cdot 7H_2O$), a sulfate of Fe, was added to one of the above seven sets of glass raw material, to thereby prepare glass raw material containing Ni metal powder and $FeSO_4 \cdot 7H_2O$; i.e., glass raw material 13.

In the same manner, iron nitrate hydrate ($Fe(NO_3)_3 \cdot 9H_2O$), a nitrate of Fe, was added in different amounts (wt. %) to three of the above seven sets of glass raw material, to thereby prepare glass raw materials containing Ni metal powder and $Fe(NO_3)_3 \cdot 9H_2O$; i.e., glass raw materials 14 to 16.

Each of these glass raw materials 10 to 16 was placed in an alumina crucible, and the crucible was placed in an electric furnace, heated, and maintained in the furnace. Thereafter, the crucible was removed from the furnace. The thus-heated glass materials were cast, to thereby obtain sample glasses 10 to 16.

Table 5 shows the additives, the amount of added additives (wt. %), the maximum particle size of NiS particles ($\mu$m), and the number of NiS particles per glass weight (number/g) in the respective sample glasses.

TABLE 5

| | Additive | Amount of addition (wt. %) | Maximum particle size ($\mu$m) | Number (number/g) |
|---|---|---|---|---|
| Sample 10 | Fe | 0.1500 | 300 | 1.70 |
| Sample 11 | $Fe_2O_3$ | 0.1500 | 120 | 0.50 |
| Sample 12 | $FeCl_3 \cdot 6H_2O$ | 0.1500 | 300 | 0.80 |
| Sample 13 | $FeSO_4 \cdot 7H_2O$ | 0.1500 | 120 | 0.73 |
| Sample 14 | $Fe(NO_3)_3 \cdot 9H_2O$ | 0.1500 | 50 | 0.01 |
| Sample 15 | $Fe(NO_3)_3 \cdot 9H_2O$ | 0.1000 | 500 | 0.66 |
| Sample 16 | $Fe(NO_3)_3 \cdot 9H_2O$ | 0.0750 | 137 | 1.03 |

As is apparent from Table 5, when an oxide, chloride, sulfate, or nitrate of Fe is added in a very small amount to the glass raw material, formation of NiS in a glass product is effectively suppressed.

In glass products actually produced in practice, the Ni content of glass is much lower than the value shown in Table 2; i.e., the content is 10 ppm (0.001 wt. %) or less as described above, and therefore the amount of the additive added to glass raw material is small. As is apparent from the results of the examples, even when the amount of additive is 0.01 wt. % or less on the basis of the weight of glass raw material, sufficient effects may be obtained.

The above-described examples are applicable to glass raw material having a composition including a coloring component; for example, ferric oxide ($Fe_2O_3$), selenium (Se), cerium (Ce), or other metallic materials in a very small amount.

Industrial Applicability

In the present invention, glass raw material comprises an additive containing an oxide, a chloride, a sulfate, or a nitrate of a metal in a very small amount, and thus formation of nickel sulfide (NiS) by reaction between nickel (Ni) and a sulfur (S) component in molten glass can be suppressed. In addition, the amount of NiS in a glass product can be greatly reduced.

Even when the aforementioned additives are added in very small amounts to a glass plate, physical properties of glass, including color, viscosity, and expansion coefficient, do not change, and the glass plate can maintain its original quality, which is very advantageous in practice.

As described above, in the present invention, a glass product containing substantially no NiS can be produced. In practice, even when additives are added in amounts of 0.01 wt. % or less to glass raw material, nickel sulfide (NiS) can be sufficiently reduced or eliminated. In addition, the production process for toughened glass does not require a soaking process, and thus production cost for the glass can be reduced.

Furthermore, soda-lime glass can be produced through a method similar to a conventionally-employed one, and thus conventional production equipment can be used as is, and therefore it is not necessary to modify the equipment or to build additional equipment. Therefore, quality of toughened glass can be enhanced and equipment operating cost can be reduced.

What is claimed is:

1. A raw material composition for soda-lime glass, comprising a mirabilite ($Na_2SO_4$)-containing glass raw material having the incorporation of an additive selected from the group consisting of a chloride of iron (Fe), Pb, or Li, a sulfate of Pb or Li, and a nitrate of Fe, Pb, or Li, wherein the additive suppresses formation of nickel sulfide in a resulting soda-lime glass.

2. A raw material composition for soda-lime glass according to claim 1, wherein the percentage by weight of the additive is 0.15% on the basis of the total weight of the glass raw material.

3. A raw material composition for soda-lime glass, comprising a mirabilite ($Na_2SO_4$)-containing glass raw material having the incorporation of lithium nitrate ($LiNO_3$), wherein about 50% of the amount of mirabilite ($Na_2SO_4$) contained in the glass raw material is replaced by the $LiNO_3$, wherein the $LiNO_3$ suppresses formation of nickel sulfide in a resulting soda-lime glass.

4. A raw material composition for soda-lime glass, comprising a mirabilite ($Na_2SO_4$)-containing glass raw material having the incorporation of an additive selected from the group consisting of lithium nitrate ($LiNO_3$), $Fe(NO_3)_3 \cdot 9H_2O$, and $FeCl_3 \cdot 6H_2O$, wherein the additive suppresses formation of nickel sulfide in a resulting soda-lime glass.

5. A raw material composition for soda-lime glass according to claim 1 or 3, further comprising at least one species selected from the group consisting of ferric oxide ($Fe_2O_3$) selenium (Se), and cerium (Ce), as a coloring component.

6. A raw material composition for soda-lime glass according to claim 1, wherein the additive is a nitrate of Fe, the percentage by weight of the additive is from 0.075% to 0.15% on the basis of the total weight of the glass raw material, wherein the additive suppresses formation of nickel sulfide in a resulting soda-lime glass.

7. A method of suppressing the formation of nickel sulfide during manufacturing soda-lime glass, comprising a step of reducing the formation of nickel sulfide by adding an additive selected from the group consisting of a chloride of Fe, Pb, or Li, a sulfate of Pb or Li, and a nitrate of Fe, Pb, or Li into a mirabilite ($Na_2SO_4$)-containing glass raw material.

8. A method of suppressing the formation of nickel sulfide during manufacturing soda-lime glass, comprising a step of reducing the formation of nickel sulfide by adding an additive selected from the group consisting of $LiNO_3$, $Fe(NO_3)_3 \cdot 9H_2O$, and $FeCl_3 \cdot 6H_2O$ into a mirabilite ($Na_2SO_4$)-containing glass raw material.

* * * * *